United States Patent [19]
Fedorovich et al.

[11] Patent Number: 5,316,317
[45] Date of Patent: May 31, 1994

[54] METHOD OF ASSEMBLING A SEAL DEVICE

[75] Inventors: George Fedorovich, Nacogdoches, Tex.; Kenneth J. Sharrer, Waterloo, N.Y.

[73] Assignee: JM Clipper Corporation, Nacogdoches, Tex.

[21] Appl. No.: 64,375

[22] Filed: May 21, 1993

[51] Int. Cl.$^5$ .............................. F16J 15/447
[52] U.S. Cl. .............................. 277/1; 277/53
[58] Field of Search ............ 277/1, 9, 26, 53, 54, 277/55, 56, 57

[56] References Cited

U.S. PATENT DOCUMENTS

| | | | |
|---|---|---|---|
| 2,995,390 | 8/1961 | Gardner | 277/26 |
| 3,015,504 | 1/1962 | Fulton et al. | 277/26 |
| 3,277,797 | 10/1966 | Tyree, Jr. et al. | 277/26 |
| 4,022,479 | 5/1977 | Orlowski | 277/53 |
| 4,114,902 | 9/1978 | Orlowski | 277/53 |
| 4,175,752 | 11/1979 | Orlowski | 277/53 |
| 4,304,409 | 12/1981 | Orlowski | 277/53 |
| 4,466,620 | 8/1984 | Orlowski | 277/53 |
| 4,576,383 | 3/1986 | Ballard | 277/53 |
| 4,630,458 | 12/1986 | Kakabaker | 72/237 |
| 4,667,967 | 5/1987 | Deuring | 277/53 |
| 4,685,684 | 8/1987 | Ballard | 277/53 X |
| 4,706,968 | 11/1987 | Orlowski | 277/53 |
| 4,743,034 | 5/1988 | Kakabaker et al. | 277/53 |
| 4,817,966 | 4/1989 | Borowski | 277/3 |
| 4,848,937 | 7/1989 | Hartman et al. | 277/56 X |
| 4,852,890 | 8/1989 | Borowski | 277/25 |
| 4,890,941 | 1/1990 | Calafell, II et al. | 384/480 |
| 4,989,883 | 2/1991 | Orlowski | 277/25 |
| 5,024,451 | 6/1991 | Borowski | 277/53 |
| 5,069,461 | 12/1991 | Orlowski | 277/25 |
| 5,158,304 | 10/1992 | Orlowski | 277/53 |

FOREIGN PATENT DOCUMENTS 3828363  2/1990  Fed. Rep. of Germany ........ 277/53

Primary Examiner—William A. Cuchlinski, Jr.
Assistant Examiner—John L. Beres
Attorney, Agent, or Firm—Dickstein, Shapiro & Morin

[57] ABSTRACT

A system for providing a seal between a housing and a shaft is formed of at least two ring members connected to each other by relative diametrical expansion with reduced or eliminated axial resilient deformation. The ring members may be held together by an annular protrusion located within a recess. To eliminate play between the protrusion and the recess, the device may be assembled by heating the recess and inserting the protrusion into the recess while the recess is expanded. The improved system can be accurately assembled, with the ring members located very close to each other. The system has improved oil retention and water exclusion properties.

9 Claims, 16 Drawing Sheets

METHOD OF ASSEMBLING A SEAL DEVICE

BACKGROUND OF THE INVENTION

1. Field of the Invention

The present invention relates to a device for providing a seal between a shaft and a housing. In particular, the present invention relates to a dynamic seal device for preventing lubricant from leaking out of a housing and/or for preventing contaminants from traveling into the housing. The present invention also relates to a method of assembling a sealed system.

2. Description of the Related Art

Prior art devices for sealing a rotating shaft are disclosed in U.S. Pat. Nos. 4,022,479 (Orlowski) and 5,024,451 (Borowski). Seal devices of this type may be used to prevent lubricant from escaping out of a bearing housing and/or to prevent contaminants from working their way into the housing. The prior art devices are formed of at least two ring-shaped members that rotate with respect to each other when the shaft is rotated. One of the members is fixed to the housing and does not rotate. The other member rotates with the rotating shaft.

The two ring members should be located very close together, particularly when the seal device is used to isolate the bearing from small particulate contaminants. Even small quantities of such contaminants are capable of significantly deteriorating the bearing. To prevent such contamination, the two relatively rotatable ring members must be held together very closely, with only a very narrow space therebetween.

The ring members of the Orlowski seal device are connected together by a separate securing means, not shown in the prior art patent. The ring members themselves have no means for establishing and maintaining a narrow spacing therebetween. Therefore, the prior art seal device cannot be manufactured as a unit with a preset, fixed spacing. The spacing between the ring members has to be set when the seal device is installed into the housing. This leaves room for human error outside the control of the device manufacturer. In particular, the Orlowski device can be improperly installed, with the ring members located too far apart to perform satisfactorily.

The ring members of the Borowski device are held together by a bead and a groove provided on the ring members themselves. The bead fits within the groove with an interference fit. This arrangement is an improvement over the Orlowski system in the sense that no separate securing means is needed. But the Borowski device is still unsatisfactory because the bead must be resiliently deformed to be positioned within the groove, and the groove must be correspondingly enlarged to receive the deformed bead. The deformation of the bead during assembly makes it difficult to achieve the desired close positioning between the two ring members, as explained in more detail below.

SUMMARY OF THE INVENTION

The disadvantages of the prior art are alleviated to a great extent by the present invention which provides a seal device including first and second ring members having connecting portions, with the connecting portion of the second ring member being located radially inside of the first ring member, and with the connecting portions being connected to each other by expansion of the first ring member relative to the second ring member.

In one aspect of the present invention, the connecting portions are connected to each other by heat-induced expansion of the first ring member.

In another aspect of the invention, the connecting portion of the first ring member is in the form of an annular recess, and the other connecting portion is an annular protrusion located within the recess.

In another aspect of the present invention, the seal device includes a third ring member for sealing the surface of a rotating shaft.

An object of the present invention is to provide a seal device that can be accurately assembled, with very little play.

Another object of the invention is to provide a high performance seal device that can be produced economically.

Another object of the present invention is to provide an improved method of assembling a seal device.

Other objects and advantages of the present invention will become apparent from the following description and drawings which illustrate preferred embodiments of the present invention.

DESCRIPTION OF PREFERRED EMBODIMENTS

Figure 1:
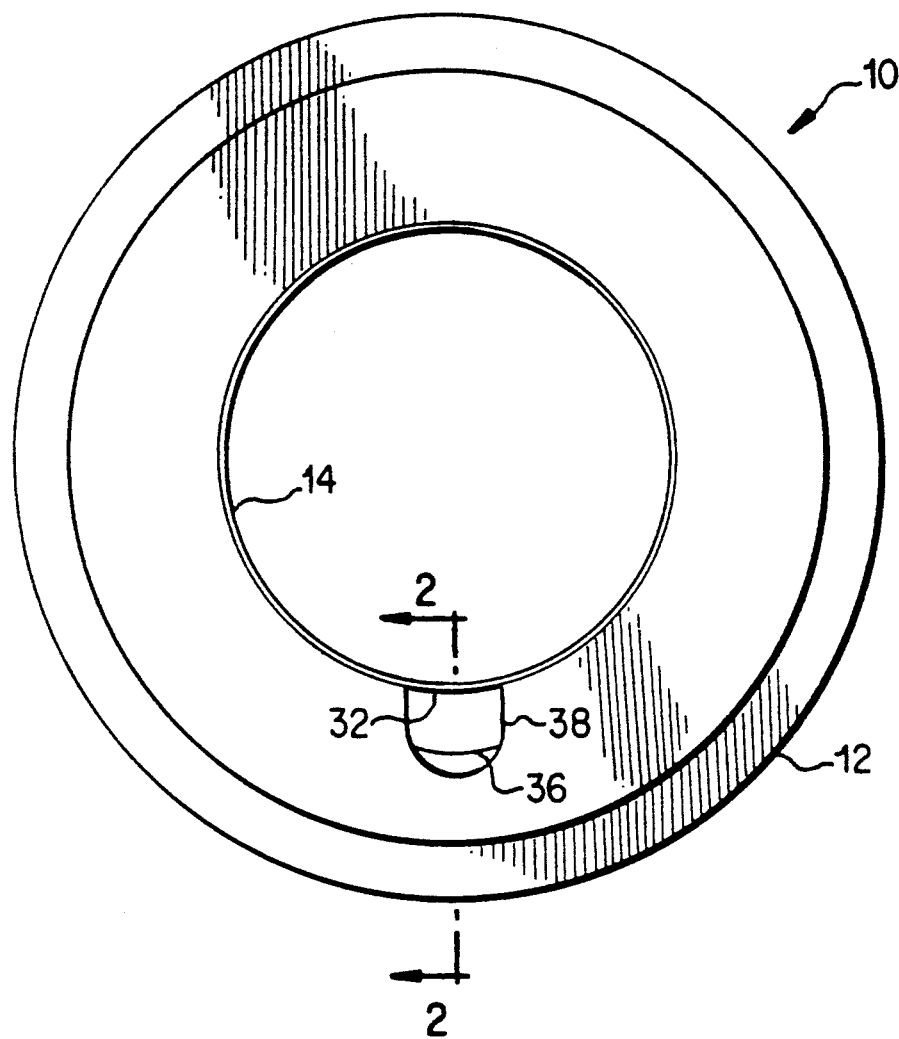
FIG. 1 is a front elevational view of a seal device constructed in accordance with a first embodiment of the present invention.
Figure 2:
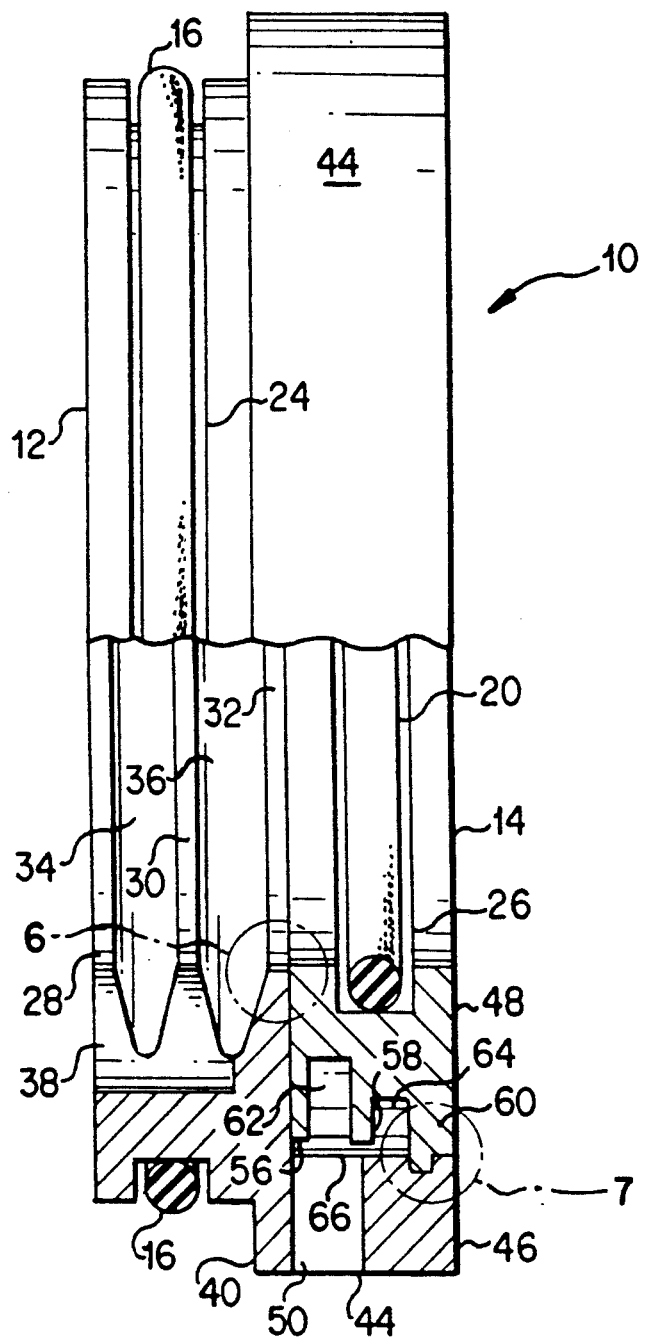
FIG. 2 is a partial cross sectional side view of the seal device of FIG. 1, taken along line 2—2 of FIG. 1.

Referring now to the drawings, wherein like reference numerals indicate like elements, there is shown in FIGS. 1-7 a ring-shaped seal device 10 constructed in accordance with a first embodiment of the present invention. The seal device 10 includes a stator member 12 and a rotor member 14 (FIG. 2). An O-ring 16 is provided between the stator member 12 and a housing 18 (FIG. 3), and an O-ring 20 is provided between the rotor member 14 and a shaft 22. The ring-shaped stator and rotor members 12, 14 may be made of a suitable metal. In a preferred embodiment of the invention, the stator and rotor members 12, 14 may be made of polytetrafluoroethylene (PTFE) or PTFE alloy. The O-rings 16, 20 may be made of a suitable elastomeric material.

The stator O-ring 16 provides a tight seal between the stator member 12 and the housing 18. Moreover, the radial compression of the O-ring 16 between the stator member 12 and the housing 18 is sufficient to prevent the stator member 12 from rotating with respect to the housing 18. The rotor O-ring 20 provides a tight seal between the rotor member 14 and the shaft 22, and the compression of the O-ring 20 between the rotor member 14 and the shaft 22 is sufficient to make the rotor member 14 rotate in unison with the shaft 22.

In operation, the stator O-ring 16 prevents oil from escaping out of the housing 18 around the outside of the stator member 12, and the rotor O-ring 20 prevents contaminants from traveling into the housing 18 along the surface of the shaft 22. Oil and contaminants are dynamically prevented from traveling in a radial direction through the interface between the two ring-shaped members 12, 14 as explained in more detail below.

Since the stator member 12 does not rotate with respect to the housing 18, the stator O-ring 16 is not subjected to friction. Therefore, the stator O-ring 16 has a long useful life. Similarly, since the rotor member 14 does not rotate with respect to the shaft 22, the rotor O-ring 20 is not subjected to friction and has a long useful life.

Figure 3:
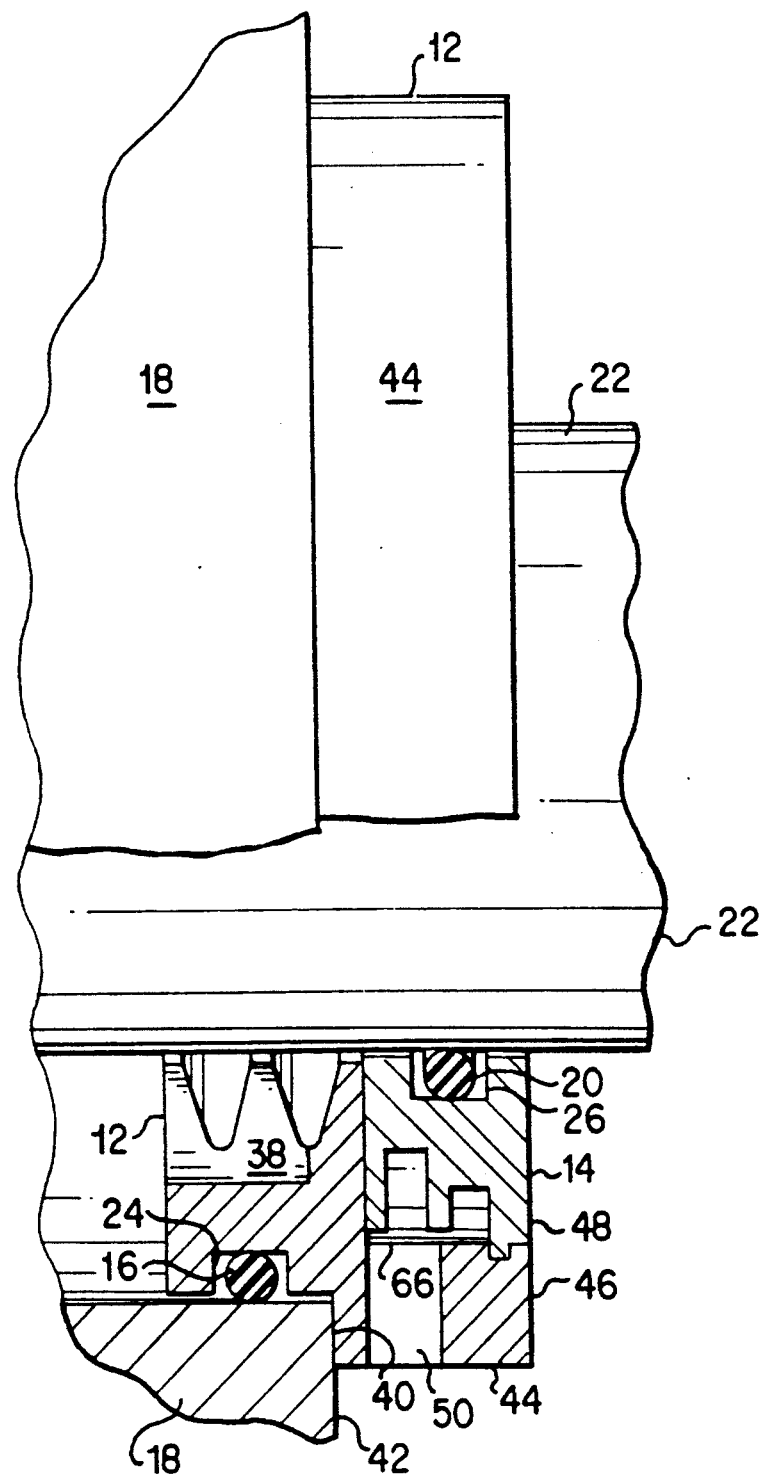
FIG. 3 is a partial cross sectional side view like FIG. 2, but showing the seal device employed within a sealed system.

The stator O-ring 16 is located within an annular recess 24. As illustrated in FIG. 3, the recess 24 has a rectangular cross section. The rotor O-ring 20 is also located within a rectangular cross sectioned annular recess 26. The purpose of the recesses 24, 26 is to ensure that the O-rings 16, 20 are located in their proper positions when the seal device 10 is installed within the housing 18 to provide a seal around the shaft 22.

Figure 4:
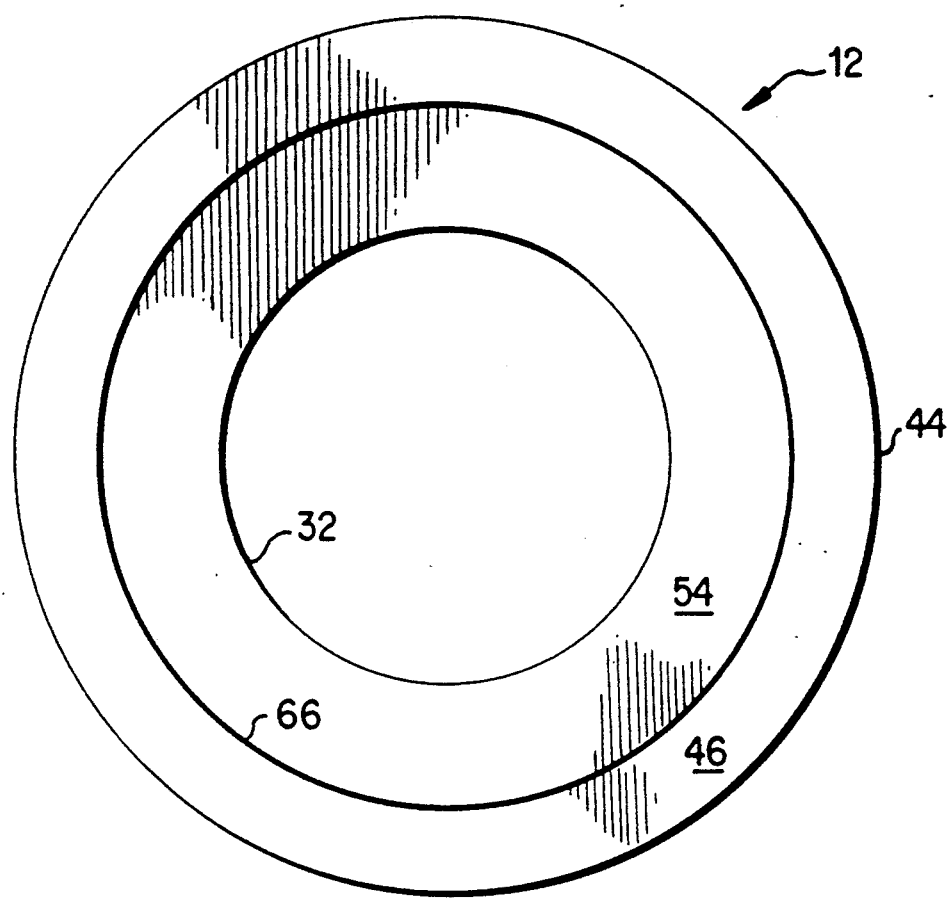
FIG. 4 is a rear elevational view of the stator member for the seal device of FIG. 1.
Figure 5:
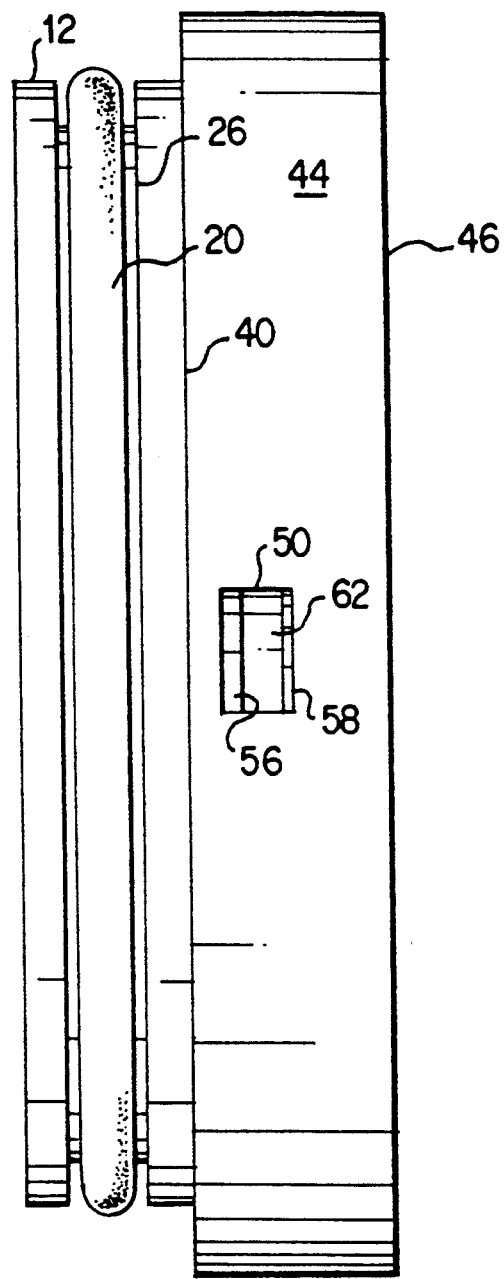
FIG. 5 is a bottom view of the seal device of FIG. 1.

For clarity of illustration, the O-rings 16, 20 are not shown in FIGS. 1 and 4.

Referring to FIG. 2, the stator member 12 has a series of alternating annular ridges 28, 30, 32 and annular grooves 34, 36. The grooves 34, 36 are located between the ridges 28, 30, 32. An axial groove 38 is provided at the bottom of the seal device 10 to connect the grooves 34, 36 to the interior of the housing 18.

In operation, lubricating oil traveling outwardly along the surface of the shaft 22 past the first ridge 28 is rotated by the rotating shaft 22 and thrown by centrifugal force into the first annular groove 34. The oil then falls by gravity into the axial groove 38 and is thereby directed back into the housing 18. Oil that makes its way past the first groove 34 and past the second ridge 30 is thrown by centrifugal force into the second groove 36 and then drained by gravity into the axial groove 38 to be directed back into the housing 18. Thus, the stator member 12 and the rotating shaft 22 work together dynamically to prevent oil from escaping out of the housing 18. Essentially no oil escapes outwardly past the second groove 36 and the third ridge 32.

The stator member 12 has an inwardly directed shoulder face 40 for contacting an outer wall 42 of the housing 18 (FIG. 3). The shoulder face 40 is used during assembly to properly locate the stator member 12 with respect to the housing 18. That is, the stator member 12 may be simply pushed into the housing 18 until the shoulder face 40 abuts against the housing wall 42. The shoulder face 40 prevents the stator member 12 from moving too far into the housing 18. The shoulder face 40 may be omitted in an alternative embodiment of the invention. Space limitations may prevent the use of the shoulder face 40.

The stator member 12 also has a ring-shaped cover 44. The cover 44 extends axially outwardly from the shoulder face 40. The cover 44 at least partially surrounds the outside diameter of the rotor member 14. The cover 44 has an outwardly directed end face 46 that is coplanar with an outwardly directed end face 48 of the rotor member 14. The cover 44 has a radial slot-shaped opening 50. The opening 50 is located at the bottom of the seal device 10 (like the axial drain groove 38 of the stator member 12). The cover opening 50 is used to direct contaminants out of the seal device 10, as described in more detail below.

Figure 6:
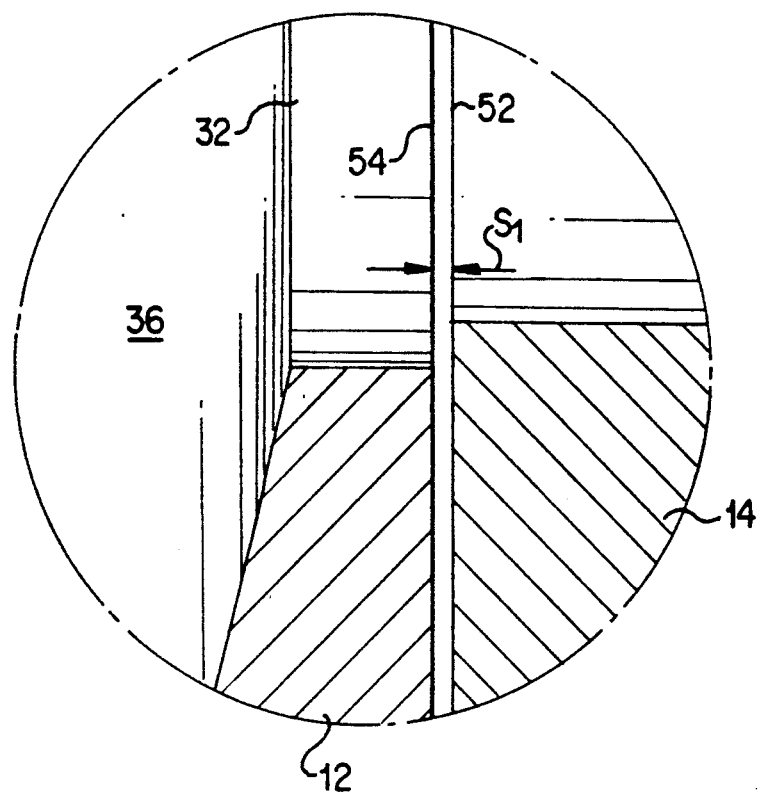
FIG. 6 is an enlarged view of the interface shown in circle 6 of FIG. 2.

Referring to FIG. 6, the rotor member 14 has an inwardly directed face 52 adjacent to an outwardly directed face 54 of the stator member 12. The two faces 52, 54 are spaced apart from each other such that there is essentially no friction between the two faces 52, 54. But the axial distance S1 between the two faces 52, 54 is very small. The distance S1 should be very small to prevent particles from traveling in a radially inward direction (i.e., toward the shaft 22) between the two faces 52, 54. If the stator and rotor members 12, 14 are made of PTFE alloy, or another suitable material, then the faces 52, 54 may lightly touch each other.

As illustrated in FIG. 2, alternating annular ridges 56, 58, 60 and recesses 62, 64 are located between the opposite end faces 52, 48 of the rotor member 14. In the illustrated embodiment of the invention, the inner recess 62 is deeper than the outer recess 64. In an alternative embodiment of the invention, the recess 64 may be deeper than the inner recess 62. The purpose of the alternating ridges 56, 58, 60 and recesses 62, 64 is to prevent contaminants from traveling toward the interior of the housing 18 and reaching the inwardly directed end face 52 of the rotor member 14, as described in more detail below.

In operation, contaminants that find their way into the space between the cover 44 and the rotor member 14 come into contact with the surfaces of the rotor recesses 62, 64. The rotation of the rotor member 14 causes the contaminants to be thrown by centrifugal force onto the inner wall 66 of the cover 44. The contaminants then move by gravity though the slot-shaped opening 50.

The stator member 12 and the rotor member 14 are connected together by connecting portions shown in circle 7 of FIG. 2. As illustrated in detail in FIG. 7, the cover 44 has an inner annular recess 68 and the rotor member 14 has a radially outwardly extending annular protrusion 70. The recess 68 is located close to the outwardly directed end face 46 of the cover 44. The recess 68 has a rectangular cross section with an outwardly directed side face 72, an inwardly directed side face 74, and a cylindrical outer surface 76. The protrusion 70 may have a slanted surface 78 for guiding the rotor member 14 into the cover 44. The protrusion 70 also has an outwardly directed side face 80 designed to be in close proximity to the inwardly directed side face 74 of the stator member 12. The axial distance between the side face 80 of the protrusion 70 and the inwardly directed side face 74 of the recess 68 is designated by reference character $S_2$.

Figure 7:
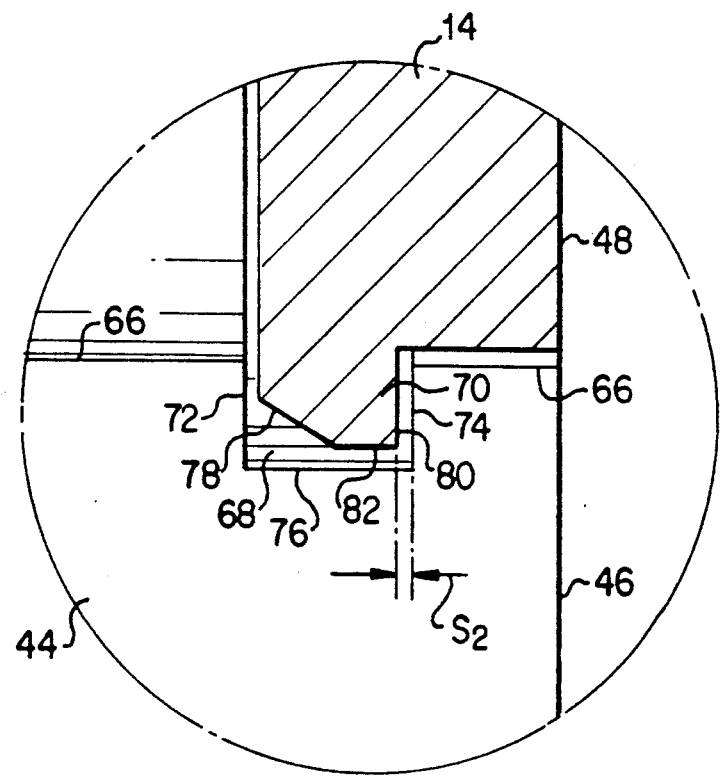
FIG. 7 is an enlarged view of the connecting portions shown in circle 7 of FIG. 2.
Figure 8:
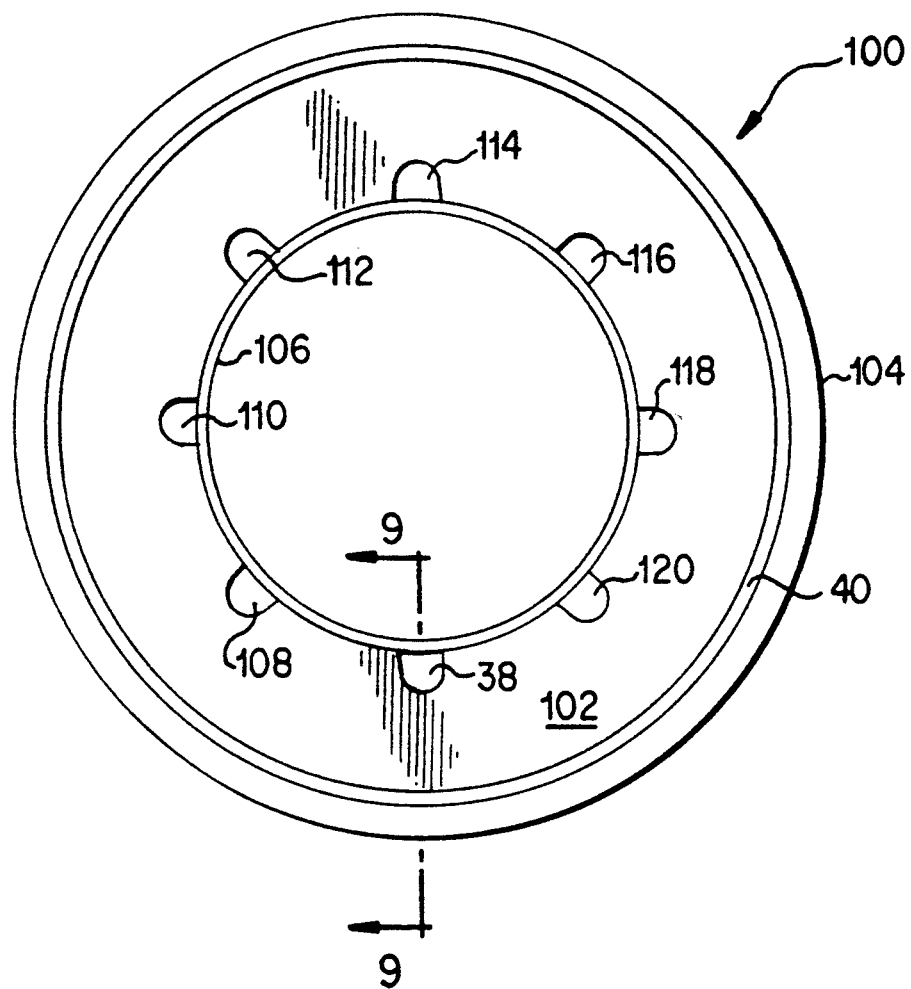
FIG. 8 is a front elevational view of another seal device constructed in accordance with the present invention.

It is advantageous to minimize the sum of the axial distances $S_1$ and $S_2$ (FIGS. 6 and 7). This sum will be referred to herein as the total axial play $S_t$ of the seal device 10 ($S_t = S_1 + S_2$) In particular, the total axial play $S_t$ should be as small as possible without being equal to zero. When the axial play $S_t$ is very small, there is very little room for contaminants to move in a radial direction through the interface between the rotor member 14 and the stator member 12 (i.e., between the end faces 52, 54. The rotor member 14 should fit within the stator member 12 with just enough play $S_t$ to ensure that there is substantially no friction between the relatively rotating members 12, 14.

To assemble the seal device 10, the stator member 12 (including the cover 44), is expanded to increase the diameter of the cylindrical inner surface 66 of the cover 44 relative to the diameter of the protrusion 70. In a preferred embodiment of the invention, the cover 44 is expanded until the diameter of the inner surface 66 is substantially equal to or greater than the diameter of the protrusion 70 at its outer end region 82. The rotor member 14 can then be easily moved axially into position within the stator member 12, with the protrusion 70 located directly radially inside of the recess 68. The stator member 12 is then allowed to return substantially to its original size such that the protrusion 70 is located within the recess 68 as illustrated in FIG. 7. In a preferred embodiment of the invention, the inner surface 66 of the cover 44 is expanded by heating the cover 44.

The above-described expansion technique is advantageous because it makes it possible to minimize the total axial play $S_t$. If the protrusion 70 were forced into the recess 68, by driving the rotor member 14 into the cover 44 without first expanding the cover 44, the radially outermost surface 82 of the protrusion 70 would be temporarily distorted outwardly. That is, the protrusion's side face 80 would be bent outwardly, increasing the axial distance between the outer end region 82 and the rotor member's inwardly directed side face 52. To provide room for this distortion during assembly, the total axial play $S_t$ would have to be increased, which would disadvantageously provide more room between the seal members 12, 14 for contaminants to travel into the housing 18. The present invention overcomes this problem by reducing or eliminating axial resilient distortion of the protrusion 70 during assembly.

In the embodiment illustrated in FIGS. 1-7, particularly satisfactory results are achieved when the diameter of the shaft 22 is approximately one and one-eighth inches, the diameter of the opening of the housing 18 receiving the stator member 12 is approximately two inches, and the total axial play $S_t$ of the device 10 is approximately four-thousandths of an inch. But the present invention is not limited to these particular dimensions.

Another seal device 100 constructed in accordance with the present invention is illustrated in FIGS. 8-12. The seal device 100 is ring-shaped and has a stator member 102, a cover member 104 connected to the stator member 102, and a rotor member 106 located between the stator member 102 and the cover member 104. The ring-shaped members 102, 104, 106 may be constructed of any suitable material, such as metal or PTFE alloy.

Figure 9:
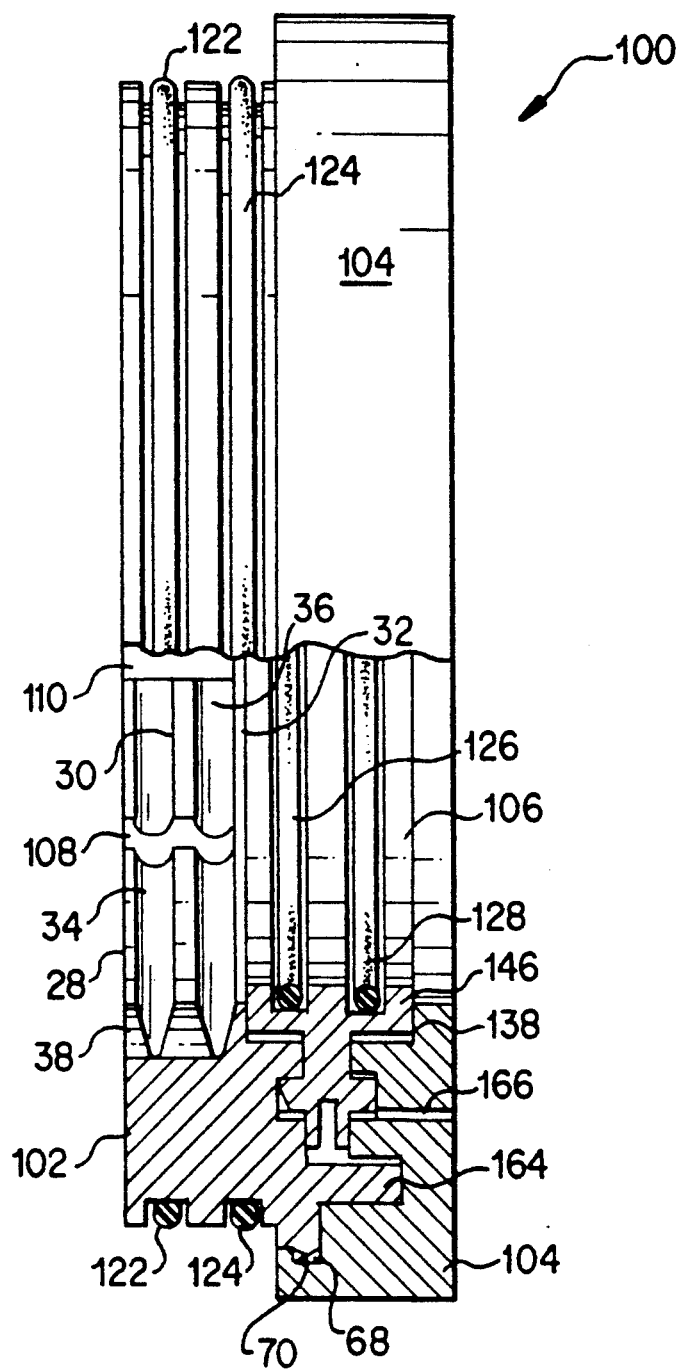
FIG. 9 is a partial cross sectional side view of the seal device of FIG. 8, taken along line 9—9 of FIG. 8.

As illustrated in FIG. 9, the stator member 102 has alternating ridges 28, 30, 32 and grooves 34, 36 and an axial groove 38 constructed essentially like those of the stator member 12 illustrated in FIGS. 1-7. But in contrast to the stator member 12, the stator member 102 also has additional axial grooves 108, 110, 112, 114, 116, 118, 120 (FIG. 8) connecting the annular grooves 34, 36 to the interior of the housing 18. Therefore, the stator member 102 is easier to install than the stator member 12, because the seal device 100 will perform satisfactorily with any one of the axial grooves 38, 108, 110, 112, 114, 116, 118, 120 located near the bottom of the seal device 100. The seal device 100 will perform satisfactorily with any one of the axial grooves 38, 108, 110, 112, 114, 116, 118, 120 located at the bottom of the seal device 100.

O-rings 122, 124 (FIG. 9) are provided for sealing the periphery of the stator member 102 to the housing 18 and for preventing the stator member 102 from rotating O-rings 126, 128 seal the rotor member 106 to the shaft 22 and prevent the rotor member 106 from rotating relative to the shaft 22. The O-rings 122, 124, 126, 128 are constructed and operate like the O-rings 16, 20 shown in FIGS. 2 and 3. For clarity of illustration, the O-rings 122, 124, 126, 128 are not shown in FIGS. 8 and 12. In alternative embodiments of the invention, one O-ring or more than two O-rings may be used for each of the members 102, 106.

Figure 10:
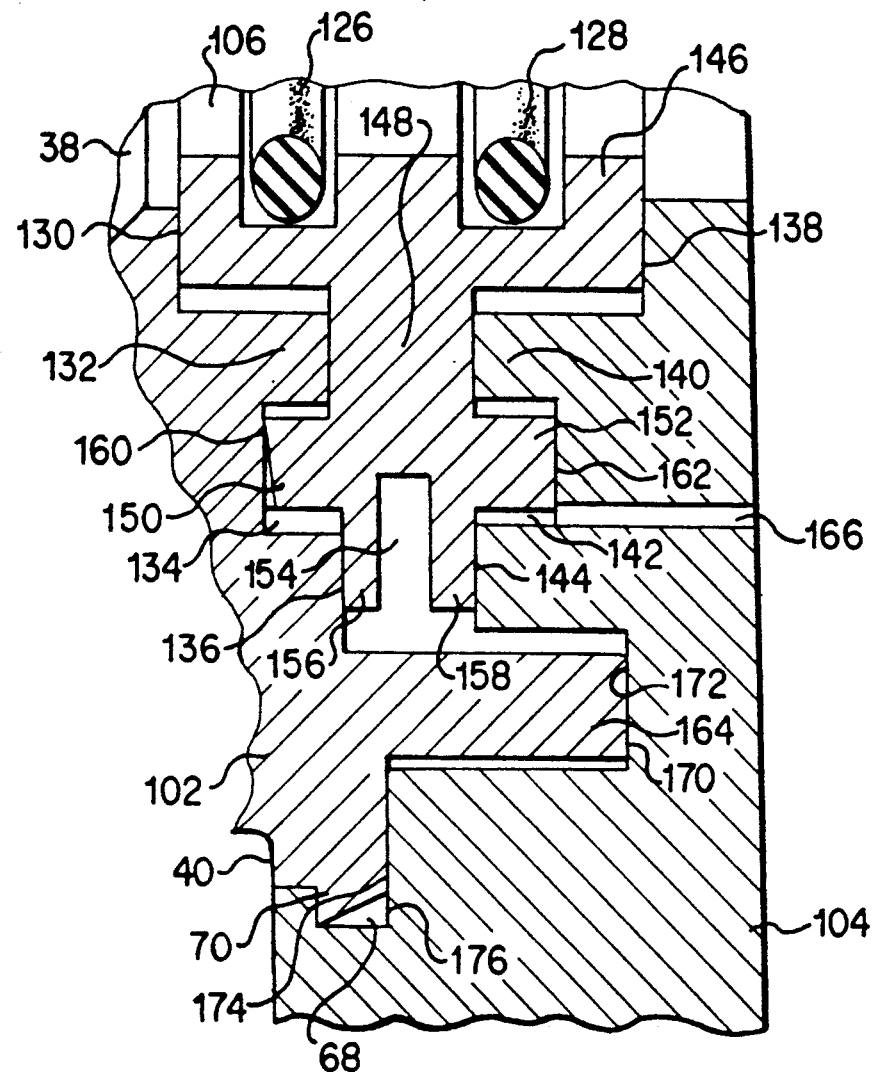
FIG. 10 is an enlarged view of a portion of FIG. 9.

Referring to FIG. 10, the stator member 102 has an outwardly directed shoulder 130, a cylindrical axially extending member 132, a cylindrical recess 134, and an annular face 136. Similarly, the cover member 104 has an inwardly directed shoulder 138, a cylindrical inwardly extending member 140, a cylindrical recess 142, and an annular face 144. The inwardly directed face region 138, 140, 142, 144 of the cover member 104 is essentially a mirror image of the outwardly directed face region 130, 132, 134, 136 of the stator member 102.

The rotor member 106 has a base portion 146 that fits between the shoulders 130, 138 of the stator and cover members 102, 104. The rotor member 106 also has a waisted section 148 for receiving the axially extending members 132, 140. Branched portions 150, 152 fit within the respective recesses 134, 142. An annular slot 154 is provided between two radially outwardly extending annular elements 156, 158, located between the annular faces 136, 144 of the ring-shaped stator and cover members 102, 104.

In an alternative embodiment of the invention, the inwardly directed branched portion 150 may have an increased radial dimension, with a radially outer cylindrical surface aligned with the periphery of the outwardly extending annular elements 156, 158. In the alternative embodiment, there would be no inwardly directed annular face 136.

In the illustrated embodiment, to prevent contaminants from traveling into the housing 18 and to provide for stable frictionless rotation of the rotor member 106 relative to the stator member 102, the axial length of the base portion 146 (measured in the direction of the axis of the shaft 22) is only slightly less (e.g., four-thousandths of an inch less) than the distance between the shoulders 130, 138, and the axial distance between the ends of the branched portions 150, 152 is only slightly less (e.g., four-thousandths of an inch less) than the distance between the radially extending surfaces 160, 162 of the cylindrical recesses 134, 142.

Figure 11:
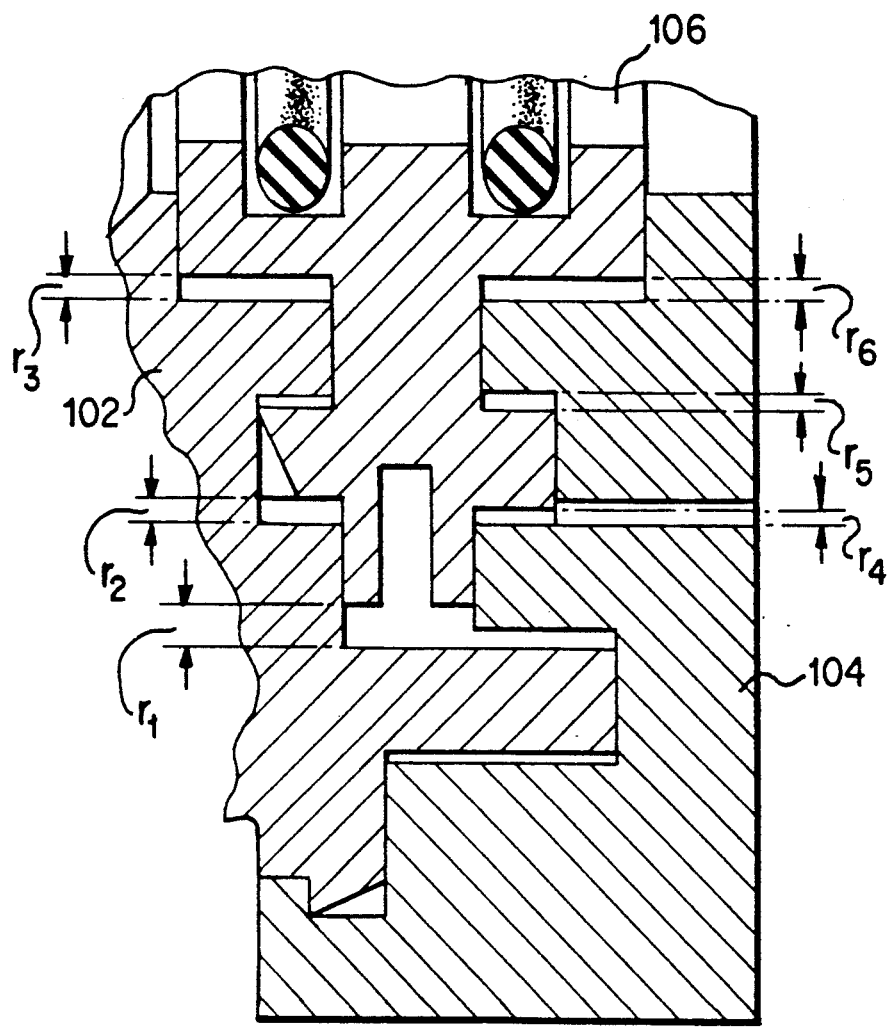
FIG. 11 is another enlarged view like FIG. 10.
Figure 12:
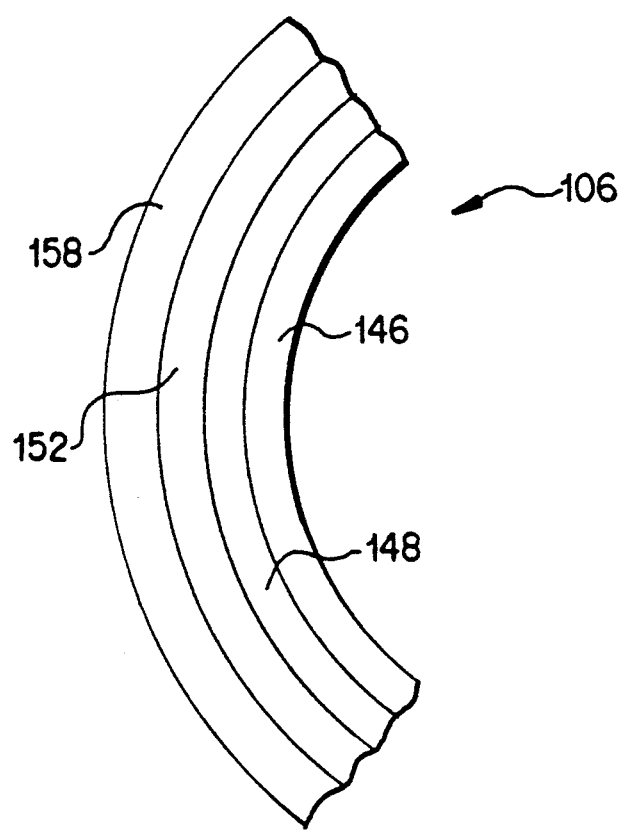
FIG. 12 is a partial rear elevational view of the rotor member for the seal device of FIG. 8.

Particularly advantageous results are achieved when the diameter of the opening for the housing 18 receiving the stator member 102 is approximately two inches, the diameter of the rotating shaft 22 is approximately one and one-sixteenth inches, the radial clearances designated by reference characters $r_1$, $r_2$ and $r_3$ in FIG. 11 are each approximately two-hundredths of an inch, and the radial clearances designated by reference characters $r_4$, $r_5$ and $r_6$ are each approximately one-hundredth of an inch. But the present invention is not limited to these particular dimensions.

In operation, contaminants that reach the radially extending interfaces between the branched portions 150, 152 (FIG. 10) and the surfaces 160, 162 of the annular recesses 134, 142 are rotated by the rotor member 106 and are thereby caused to move radially outwardly (i.e., away from the shaft 22). Contaminants located between the stator member 102 and the inwardly directed branched portion 150 are moved by centrifugal force into the space located radially outwardly of the rotor member 106 (i.e., in the vicinity of the annular slot 154 and radially inside of an annular ledge 164). Contaminants located between the cover member 104 and the outwardly directed branched portion 152 are directed out of the device 100 through axial passageways 166 (only one of which is shown in the drawings)

The passageways 166 may be equally spaced apart from each other and equidistantly spaced from the shaft 22. The passageways 166 may be sufficiently close to each other that one of the passageways 166 is always available for draining contaminants out of the cover member 104 by gravity regardless of the orientation of the device 100. In the illustrated embodiment, there are eight passageways 166. But the advantages of the invention may be achieved with more or less passageways. In the illustrated embodiment, the diameters of the passageways 166 are each approximately six-hundredths of an inch. But the advantages of the invention may be achieved with larger or smaller passageways.

The cover member 104 is connected to the stator member 102 by connecting portions that are constructed essentially like the connecting portions 44, 68, 70, 14 illustrated in detail in FIG. 7. The connecting portions are connected together by first increasing the diameter of the cover member 104 (e.g., by heating the cover member 104), then inserting the stator member 102 into the cover member 104 with the rotor member 106 in position between the stator and cover members 102, 104, and then reducing the diameter of the cover member 104 (e.g., by cooling the cover member 104) such that the protrusion 70 fits snugly within the recess 68. In the illustrated embodiment of the invention, connection of the cover member 104 to the stator member 102 is achieved with reduced or eliminated axial deformation of the protrusion 70 relative to the recess 68.

The above-described relative expansion technique makes it possible to minimize the separation between a ledge receiving face 170 and the end 172 of the ledge 164, and to minimize the separation between the respective shoulder faces 174, 176 of the stator and cover members 102, 104, such that the stator and cover members 102, 104 fit tightly together. The fit between the stator and cover members 102, 104 should preferably be so tight that the cover member 104 is not movable with respect to the stator member 102. Ideally, there is essentially no separation between the ledge receiving face 170 and the ledge end 172, essentially no separation between the shoulder faces 174, 176, and essentially no separation between the inwardly directed face of the protrusion 70 and the outwardly directed face of the annular recess 68.

Figure 13:
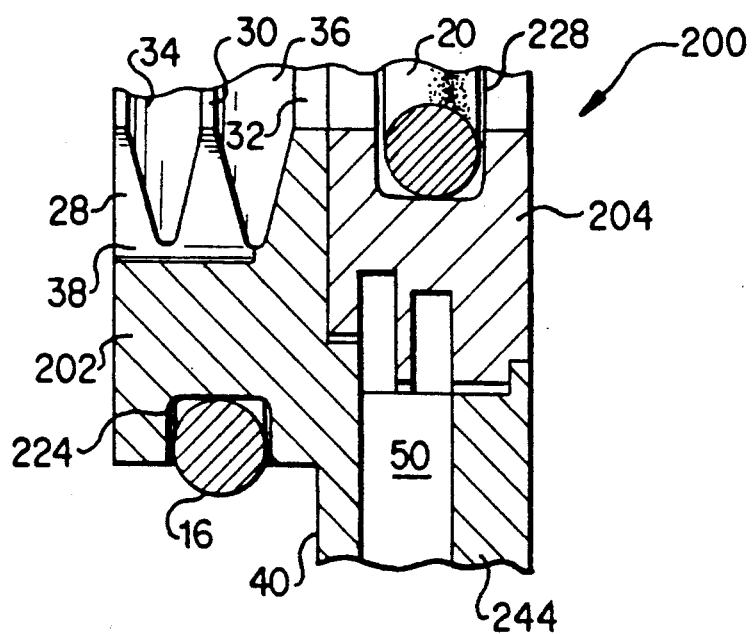
FIG. 13 is a partial cross sectional view of another seal device constructed in accordance with the present invention.
Figure 14:
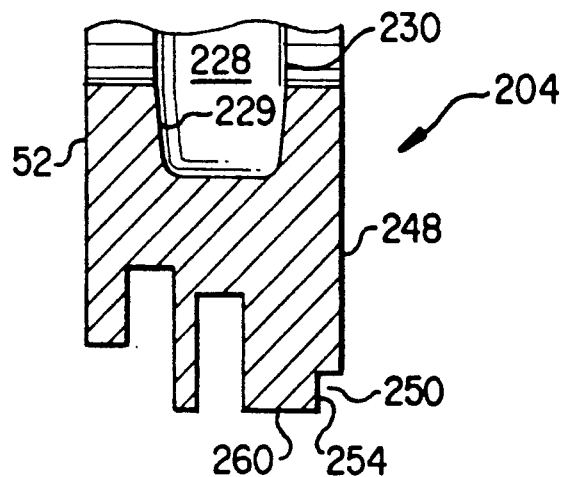
FIG. 14 is a partial cross sectional view of the rotor member for the seal device of FIG. 13.
Figure 15:
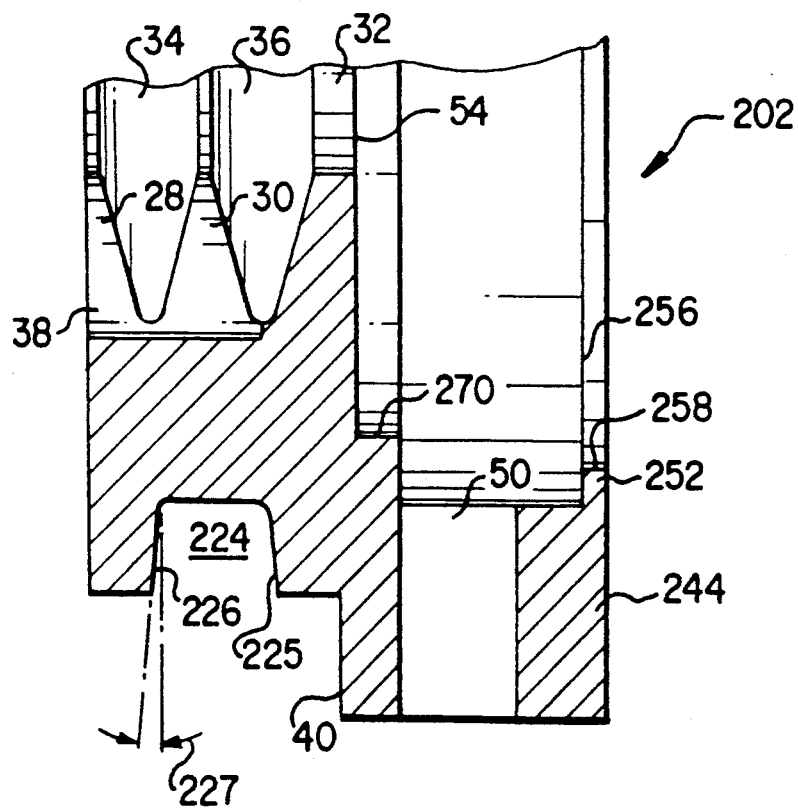
FIG. 15 is a partial cross sectional view of the stator member for the seal device of FIG. 13.

Another seal device 200 constructed in accordance with the present invention is illustrated in FIGS. 13-15. The seal device 200 is ring-shaped and has a stator member 202 and a rotor member 204. As in the above-described embodiments, an O-ring 16 is provided between the stator member 202 and the housing 18, and an O-ring 20 is provided between the rotor member 204 and a shaft 22. For clarity of illustration, the housing 18 and the shaft 22 are not shown in FIGS. 13-15. The ring-shaped stator and rotor members 202, 204 may be made of the same materials as the stator and rotor members 12, 14 of the embodiment illustrated in FIGS. 1-7.

The operation of the embodiment illustrated in FIGS. 13-15 is similar to the operation of the embodiment illustrated in FIGS. 1-7. The stator O-ring 16 prevents oil from escaping out of the housing 18 around the outside of the stator member 202, and the rotor O-ring 20 prevents contaminants from travelling into the housing 18 along the surface of the shaft 22. Oil and contaminants are dynamically prevented from travelling in a radial direction through the interface between the two ring-shaped members 202, 204.

The stator O-ring 16 for the embodiment illustrated in FIGS. 13-15 is located within an annular recess 224. As illustrated in FIG. 15, the recess 224 has a generally rectangular cross-section with sidewalls 225 and 226 that diverge slightly away from each other in the radial direction. In a preferred embodiment of the invention, the divergence 227 of the sidewalls 225 and 226 from radial planes is approximately 5°. The diverging walls 225 and 226 make it easier to install and operate the seal device 200. The recess 224 may be used with the seal devices 10, 100 described above. The O-ring 20 is located in a recess 228 (FIG. 14) that is similar to the recess 224 in that it has diverging sidewalls 229, 230.

For clarity of illustration, the O-rings 16, 20 are not shown in FIGS. 14 and 15.

Referring to FIG. 15, the stator member 202 has a series of alternating annular ridges 28, 30, 32 and annular grooves 34, 36 for dynamically preventing oil from escaping out of the housing 18. As in the first embodiment, essentially no oil escapes outwardly past the second groove 36 and the third ridge 32.

The stator member 202 also has a ring-shaped cover 244. The cover 244 extends axially outwardly from the shoulder face 40, similarly to the cover 44 of the first embodiment. The cover 244 at least partially surrounds the outside diameter of the rotor member 204.

An important difference between the embodiment illustrated in FIGS. 1-7 and the embodiment illustrated in FIGS. 13-15 is that the rotor member 204 for the latter embodiment has an annular notch 250 (FIG. 14) located in its outwardly directed end face 248. The cover 244 (FIG. 15) has a radially inwardly directed annular tooth 252 which fits into the notch 250 to maintain the rotor member 204 in position during use. The dimensions of the seal device 200 are such that the total axial play (i.e., the sum of the distance between the inwardly and outwardly directed faces 52, 54 and the axial spacing between the side face 254 of the notch 250 and the side face 256 of the annular tooth 252 is very small, to prevent particles from travelling in a radially inwardly direction (i.e., toward the shaft 22) between the two faces 52, 54.

As illustrated in FIG. 15, the stator member 202 has an offset portion 270 which surrounds the interface between the faces 52, 54, and which thereby increases the effectiveness of the seal device 200.

To assemble the seal device 200, the stator member 202 (including the cover 244) is expanded to increase the diameter of the radially inner surface 258 of the annular tooth 252 relative to the radially outer surface 260 of the rotor member 204. In a preferred embodiment of the invention, the cover 244 is expanded until the diameter of the inner tooth surface 258 is substantially equal to or greater than the diameter of the outer rotor member surface 260. The rotor member 204 can then be easily moved axially into position Within the stator member 202, with the annular tooth 252 fitting snugly within the annular notch 250.

Figure 16:
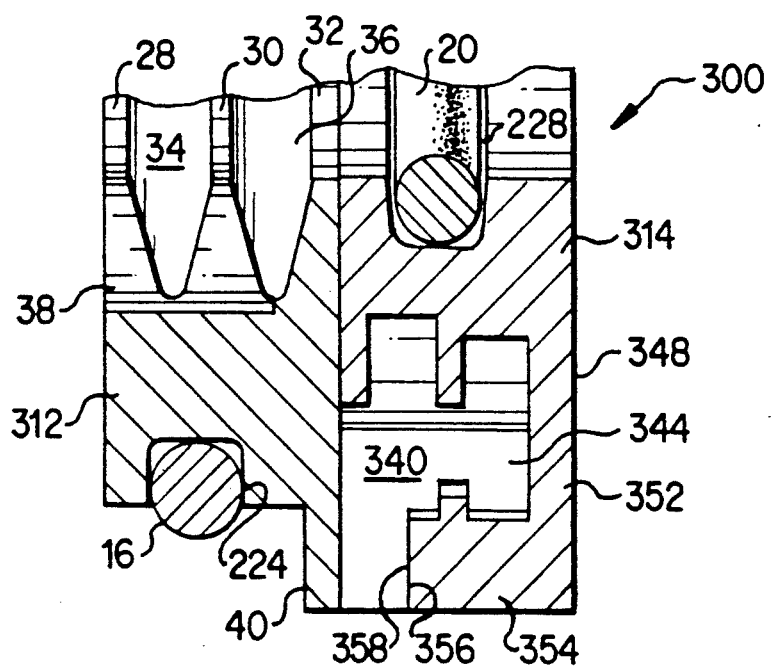
FIG. 16 is a partial cross sectional view of another seal device constructed in accordance with the present invention.
Figure 17:
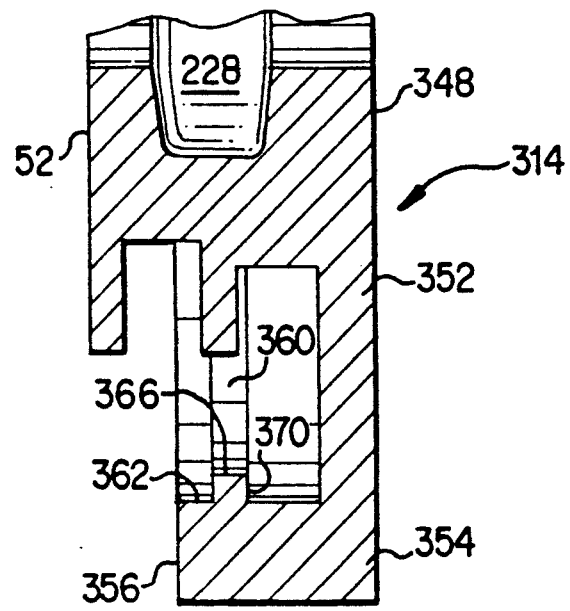
FIG. 17 is a partial cross sectional view of the rotor member for the seal device of FIG. 16.
Figure 18:
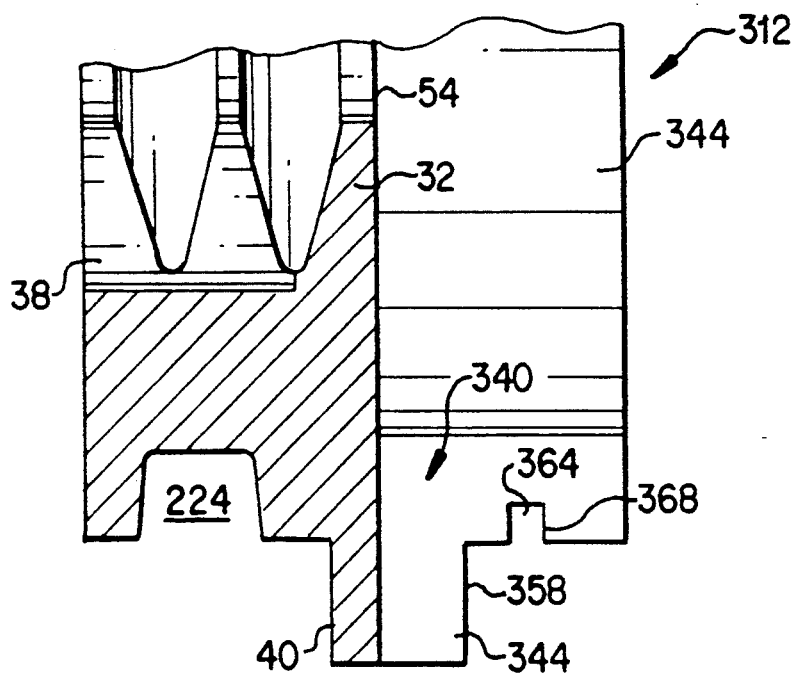
FIG. 18 is a partial cross sectional view of the stator member for the seal device of FIG. 16.

Another seal device 300 constructed in accordance with the present invention is illustrated in FIGS. 16–18. The seal device 300 includes a stator member 312 and a rotor member 314. In an assembled condition, an O-ring 16 is provided between the stator member 212 and the housing 18, and an O-ring 20 is provided between the rotor member 314 and the shaft 22. The O-rings 16, 20 are located within recesses 224, 228, similarly to the embodiment illustrated in FIGS. 13–15. The ring-shaped stator and rotor members 312, 314 may be formed of the same materials as in the embodiments described above. The overall operation of the seal device 300 is similar to the operation of the embodiments illustrated in FIGS. 1–7 and 13–17.

The stator member 312 has a ring-shaped cover 344 extending axially outwardly from a shoulder face 40. The cover 344 at least partially surrounds the outside diameter of the rotor member 314. The cover 344 has a radial opening 340 located at the bottom for directing contaminants out of the seal device 300, as in the above-described embodiments.

In the embodiment illustrated in FIGS. 16–18, the cover 344 is shorter than the rotor member 314. The rotor member 314 has an outwardly directed end face 348 with a diameter that is substantially equal to the diameter of the stator member 312. An intermediate portion 352 extends radially outwardly to an enclosure member 354. The enclosure member 354 at least partially surrounds the cover 344 when the seal device 300 is assembled. The enclosure member 354 has an inwardly directed end face 356 that fits snugly against an outwardly directed flange face 358 of the cover 344.

An annular tooth 360 (FIG. 17) is located on the radially inner surface 362 of the enclosure member 354. The annular tooth 360 fits within a recess 364 (FIG. 18) located in the radially outer surface of the cover 344.

To assemble the seal device 300, the rotor member 314 (including the enclosure member 354) is expanded to increase the diameter of the inner surface 366 of the annular tooth 360 (FIG. 17). By expanding the inner tooth surface 366, the rotor member 314 can be moved into position with the relatively rotatable faces 52, 54 directly adjacent each other, and the enclosure member 354 may then be cooled or otherwise allowed to return substantially to its original size.

In the embodiment illustrated in FIGS. 16–18, the total axial play $S_t$ would be equal to the sum of the distance between the faces 52, 54 and the distance between the inwardly directed side face 368 of the recess 364 and the outwardly directed side face 370 of the annular tooth 360. By minimizing the total axial play $S_t$, there is very little room for contaminants to move in a radial direction through the interface between the rotor member 314 and the stator member 312. The rotor member 314 should fit together with the stator member 312 with just enough play $S_t$ to ensure that there is substantially no friction between the relatively rotating members 312, 314. If the members 312, 314 are formed of an appropriate material such as PTFE alloy, the total axial play $S_t$ may be such that the end faces 52, 54 of the relatively rotating members 314, 312 come into contact with each other.

Figure 19:
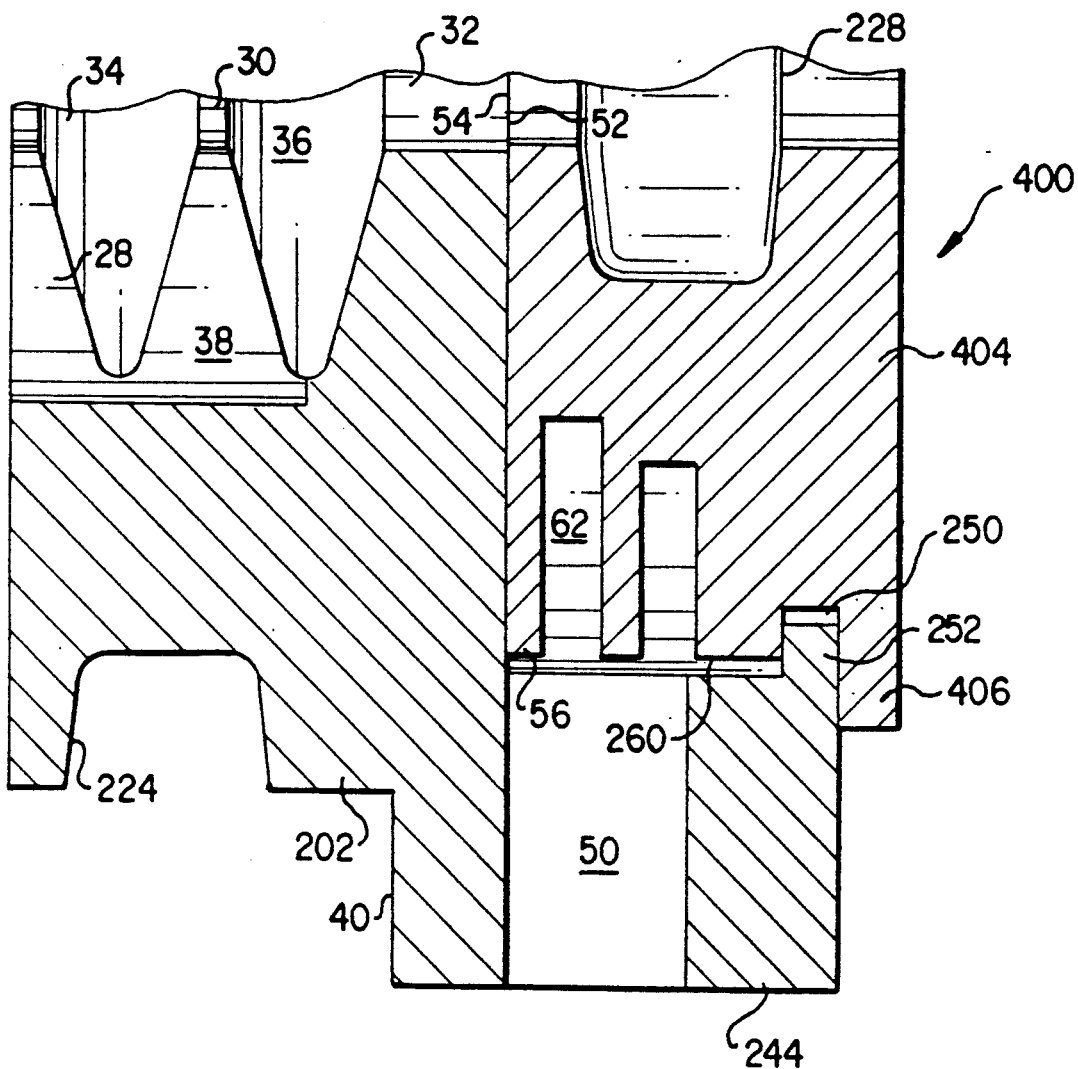
FIG. 19 is a partial cross sectional view of another seal device constructed in accordance with the present invention.

Another seal device 400 constructed in accordance with the present invention is illustrated in FIG. 19. The seal device 400 is similar in structure and function to the seal device 200 illustrated in FIG. 13. However, the rotor member 404 for the seal device 400 has a cover flange 406 with an outer diameter that is greater than the outer diameter of the outer rotor member surface 260. The cover flange 406 helps prevent material from moving into the space between the cover 244 and the outer rotor member surface 260. Another important difference between the seal device 400 and the seal device 200 is that the seal device 400 does not have an offset portion 270 surrounding the interface between the faces 52, 54. For clarity of illustration, the O-rings 16, 20 are not illustrated in FIG. 19. In operation, the O-rings 16, 20 would be located in the respective recesses 224, 228, as in the embodiment illustrated in FIG. 13.

The above description is intended to be illustrative of preferred embodiments which can achieve the objects, features and advantages of the present invention It is not intended that the present invention be limited thereto. Any modifications coming within the spirit and scope of the following claims are to be considered part of the present invention.

What is claimed as new and desired to be protected by Letters Patent of the United States is:

1. A method of assembling a seal device, said method comprising the steps of:
   providing a first ring member having a connecting portion;
   providing a second ring member having a connecting portion;
   heating said connecting portion of said first ring member;
   subsequently, positioning said connecting portions such that said connecting portion of said second ring member is located radially inside of said connecting portion of said first ring member; and
   subsequently, cooling said connecting portion of said first ring member, and thereby connecting said first and second ring members together; and
   wherein said connecting portions include a recess and a protrusion, and wherein said connecting step includes the step of locating said protrusion within said recess; and
   wherein said connecting step includes the step of rotatably connecting said first and second ring members together. such that said recess and said protrusion are rotatable relative to each other subsequent to said connecting step.

2. A method of assembling a seal device, said method comprising the steps of:
   providing a first ring member having a connecting portion;

providing a second ring member having a connecting portion;

heating said connecting portion of said first ring member;

subsequently, positioning said connecting portions such that said connecting portion of said second ring member is located radially inside of said connecting portion of said first ring member; and subsequently, cooling said connecting portion of said first ring member, and thereby connecting said first and second ring members together; and wherein said connecting portion of said first ring member includes an annular recess, and wherein said connecting portion of said second ring member includes an annular protrusion, and wherein said connecting step includes the step of locating said annular protrusion within said recess.

3. The method of claim 2, wherein said annular protrusion has a slanted surface, and wherein said step of positioning said connecting portions includes the step of using said slanted surface to guide said second ring member into said first ring member.

4. The method of claim 3, wherein said first ring member includes a radially inwardly directed substantially cylindrical surface, said annular recess being located within said radially inwardly directed surface, and wherein said annular protrusion has an annular outer end region, said step of heating said connecting portion including the step of increasing the diameter of said radially inwardly directed surface until the diameter of said radially inwardly directed surface is equal to or greater than the diameter of said annular outer end region of said annular protrusion.

5. The method of claim 4, wherein said first ring member includes an annular ridge, an annular groove, an outwardly directed face, an annular cover, and an axial groove for directing lubricant back into a housing, said cover having an opening for directing contaminants radially out of said first ring member, said second ring member including an annular recess for preventing contaminants from reaching said outwardly directed face of said first ring member, and wherein said method includes the step of positioning said second ring member radially inside of said annular cover.

6. The method of claim 3, further comprising the steps of providing a third ring member and locating said third ring member between said first and second ring members.

7. The method of claim 6, wherein said second ring member includes a shoulder face for positioning said second ring member with respect to a housing, said shoulder face being adjacent to said annular protrusion.

8. The method of claim 1, wherein said recess is an annular recess, said protrusion being an annular protrusion.

9. The method of claim 2, wherein said connecting step includes the step of rotatably connecting said first and second ring members together, such that said ring members are rotatable relative to each other subsequent to said connecting step.

* * * * *